United States Patent
Kim et al.

(10) Patent No.: US 6,917,633 B2
(45) Date of Patent: Jul. 12, 2005

(54) FREQUENCY TUNABLE OPTICAL OSCILLATOR WITH FIBER GRATING MIRRORS

(75) Inventors: Ho-Young Kim, Daejeon (KR); Eun-Soo Nam, Daejeon (KR); Kyoung-Ik Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 142 days.

(21) Appl. No.: 10/376,455

(22) Filed: Mar. 3, 2003

(65) Prior Publication Data

US 2004/0086019 A1 May 6, 2004

(30) Foreign Application Priority Data

Oct. 31, 2002 (KR) .................. 10-2002-0067053

(51) Int. Cl.[7] ............ H01S 3/10; H01S 3/083; H01S 3/08
(52) U.S. Cl. ............ 372/20; 372/26; 372/27; 372/28; 372/94; 372/99; 372/102
(58) Field of Search ............ 372/6, 14, 20, 372/23, 26, 27, 28, 32, 94, 99, 102

(56) References Cited

U.S. PATENT DOCUMENTS 5,623,508 A * 4/1997 Grubb et al. .............. 372/3

* cited by examiner

*Primary Examiner*—Minsun Oh Harvey
*Assistant Examiner*—Armando Rodriguez
(74) *Attorney, Agent, or Firm*—Mayer, Brown, Rowe & Maw LLP

(57) ABSTRACT

There is provided a millimeter wave band frequency optical oscillator predicted to be used as a millimeter wave oscillating frequency signal source in a base station of a millimeter wave wireless transmission system. The optical oscillator has a double resonator structure in which a pair of wavelength tunable fiber grating mirrors are inserted into a unilateral fiber-ring laser resonator in order to internally and additionally form a linear laser resonator. The double resonator structure composed of the two stable laser resonators can oscillate laser of two modes. Due to a beat phenomenon occurring between the two modes, received laser is modulated to an ultra-speed frequency of 60 GHz or greater. A variation in the gain within a resonator is induced by a polarization controller using the dependency of laser modes upon polarization. A modulation frequency is consecutively changed from 60 GHz to 80 GHz by controlling the wavelength of light reflected by the fiber grating mirrors.

8 Claims, 3 Drawing Sheets

FREQUENCY TUNABLE OPTICAL OSCILLATOR WITH FIBER GRATING MIRRORS

BACKGROUND OF THE INVENTION

This application claims the priority of Korean Patent Application No. 2002-67053, filed on Oct. 31, 2002, in the Korean Intellectual Property Office, the disclosure of which is incorporated herein in its entirety by reference.

1. Field of the Invention

The present invention relates to a high frequency optical oscillator in the field of wireless telecommunications, and more particularly, to a millimeter wave band frequency optical oscillator.

2. Description of the Related Art

Next-generation ultra-speed wireless Internet services can transmit a large capacity (about 100 Mbps) of information, which is 10 times or greater than the information transmitted by existing wireless Internet service, to wireless subscribers. In order to achieve this, millimeter wave wireless transmission systems that transmit a large capacity of information have been actively developed. In the millimeter wave wireless transmission systems, a millimeter wave band frequency optical oscillator is anticipated to be used as a millimeter wave oscillating frequency signal source in a base station and also as an optical line network between base stations.

In the field of millimeter wave wireless transmission systems, optical oscillators using semiconductor high frequency optical modulators and optical oscillators using a resonator modulation method have been developed up to now. The optical oscillators using optical modulators have a frequency band limited to 30 GHz at most, and accordingly they are not suitable for a frequency band that is being currently studied. Also, the optical oscillators using optical modulators are not practical because it is difficult to manufacture an optical source. On the other hand, the present applicant has continuously reported improved versions of the optical oscillators using a resonator modulation.

For example, the present applicant has Korean Patent Application No. 1999-61149 filed on Dec. 23, 1999, which discloses an optical oscillator capable of being modulated to a maximum of 20 GHz due to a beat phenomenon occurring between two laser modes by oscillating the two laser modes within a resonator formed by combining a fiber-ring laser resonator and a fiber linear laser resonator using a 50% fiber coupler. The present applicant also has Korean Patent Application No. 2000-54801 filed on Sep. 19, 2000, which discloses an oscillator capable of being modulated to a maximum frequency of 40 GHz at most by combining two fiber-ring laser resonators using the 50% fiber coupler.

The optical oscillators proposed by the present applicants are improved versions of conventional optical oscillators but have complicated structures because two individual fiber laser resonators must be combined using a fiber coupler. In addition, in order to be used as a millimeter wave oscillating frequency signal source, the proposed optical oscillators require to be modulated to a wider frequency band.

SUMMARY OF THE INVENTION

The present invention provides a frequency tunable optical oscillator in which a modulation frequency consecutively varies at a high modulation frequency of 60 GHz or greater, which could not be achieved by a currently-used optical oscillator.

According to an aspect of the present invention, there is provided a frequency tunable optical oscillator, in which a pair of fiber grating mirrors by which the wavelength of light that can be reflected varies are installed within a fiber-ring laser resonator in order to additionally form a linear laser resonator that reciprocates between the two fiber grating mirrors. Input light can be modulated to an ultra-high frequency by generating a beat phenomenon between two laser modes oscillated by the fiber-ring laser resonator and the linear laser oscillator, respectively. A modulation frequency consecutively varies by changing the wavelength of light reflected by the fiber grating mirrors.

Preferably, the fiber-ring laser resonator includes a polarization controller for modulating the frequency of output light.

Preferably, the fiber-ring laser resonator includes: a wavelength division multiplexing (WDM) coupler receiving pump laser; a light amplifying fiber amplifying light received from the WDM coupler; a dispersion shifting fiber performing nonlinear polarization on light received from the light amplifying fiber; a direction controller controlling the direction of light received from the dispersion shifting fiber; a polarization controller modulating the frequency of output light by controlling the angle of light received from the direction controller; and an output port outputting the output light. The fiber grating mirrors are installed before and behind the direction controller, respectively.

Preferably, the length of the light amplifying fiber is 3 m, the length of the dispersion shifting fiber is 4 m, and the output port is a 10% fiber coupler.

In a single laser resonator, laser is oscillated at a wavelength having the maximum gain during one-time resonance. In a unilateral fiber-ring laser resonator, laser is oscillated at a single wavelength having the maximum gain obtained from the gain of an optical amplification medium and a gain depending on a selection of a polarization mode made when birefringence is performed on the polarization mode of laser existing within a fiber. In the present invention, a pair of fiber grating mirrors that reflect only light having a particular wavelength are added to the unilateral fiber-ring laser resonator, thereby internally forming another resonator that reciprocates between the two mirrors. Consequently, an optical oscillator according to the present invention generates two independent laser modes.

As described above, the present invention provides an optical oscillator in which a modulation frequency can consecutively vary from 60 GHz to 80 GHz. In the optical oscillator according to the present invention, a polarization mode for oscillated laser is selected by controlling the angle of a polarization controller installed within a resonator, and thus a beat frequency between two laser polarization modes can be changed to two frequency ranges, i.e., 64 GHz and 222 GHz.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, embodiments of the present invention will be described in detail with reference to the attached drawings. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

Figure 1:
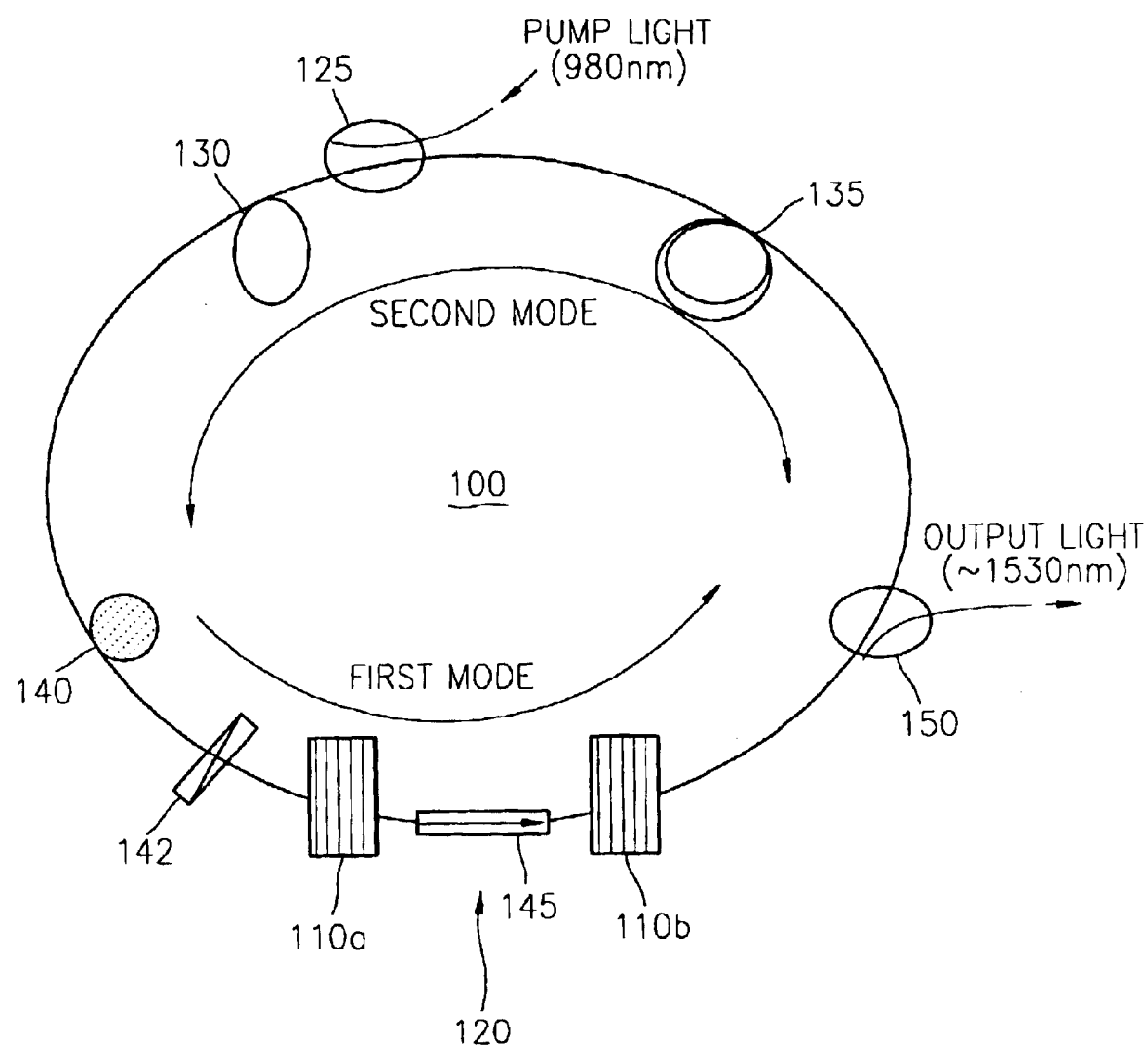
FIG. 1 is a schematic structure diagram of a frequency tunable optical oscillator with fiber grating mirrors according to the present invention.

Referring to FIG. 1, an optical oscillator using fiber grating mirrors, according to the present invention, is basically constituted of a single fiber-ring laser resonator 100. In the optical oscillator, a pair of fiber grating mirrors 110a and 110b, in which the wavelength of light that can be reflected varies, are installed within the fiber-ring laser resonator 100 such that a linear laser resonator 120 which reciprocates between the two fiber grating mirrors 110a and 110b is added to the inside of the optical oscillator. Due to a beat phenomenon between two laser modes (first and second modes) oscillated by the two laser resonators 100 and 120, output light is modulated to an ultra-high frequency (60 GHz or greater). By varying the wavelength of light that can be reflected by the fiber grating mirrors 110a and 110b, a high performance laser source capable of consecutively varying a modulation frequency can be implemented.

The ring laser resonator 100 includes a wavelength coupler 125 for receiving pump light, a 3 m-long light amplifying fiber (LAF) 130, a 4 m-long dispersion shifting fiber (DSF) 135, a polarization controller (PC) 140, a direction controller (DC) 145 which blocks a light path, and a 10% fiber coupler (FC) 150 for output light. An example of the LAF 130 is an EDFA that can amplify a wavelength of 1550 nm by doping a fiber with $Er^{3+}$ ions. In this structure, the ring laser resonator 100 advances light in one direction. The fiber grating mirrors 110a and 110b are installed in front of and behind the DC 145.

The wavelength coupler 125 is installed at one end of the LAF 130 in order to receive pump light. For example, the wavelength coupler 125 is a wavelength division multiplexing (WDM) coupler that receives pump laser composed of a laser diode (LD) with a 980 nm wavelength. The LD having a 980 nm wavelength can be made of AlInGaAs. Light received via the wavelength coupler 125 is amplified by the LAF 130. The DSF 135 performs a non-linear polarization on light transmitted by the LAF 130. Light generated over a wide frequency band due to pumping is subjected to birefringence in the DSF 135 and accordingly has a gain depending on polarization. The DC145 controls the direction of light received from the DSF 135 so that the light has a constant oscillation direction. The PC 140 and a linear polarizer 142 control the orientation angle and phase retardation of light received from the DC 145 and, consequently, are used to select only a polarization state where resonance is possible. The FC 150 serves as an output port for outputting output light. Here, the output light has a 1530 nm wavelength.

The fiber grating mirrors 110a and 110b installed before and behind the DC 145 correspond to wavelength selection mirrors. In the wavelength selection mirrors, wherein the refractive index of a light passage portion at the centre of a fiber is periodically changed, light with a particular wavelength existing within a narrow wavelength range defined by the refractive index changing period is reflected, while light existing beyond the defined wavelength range passes. Due to the installation of the fiber grating mirrors 110a and 110b, the linear laser resonator 120 is formed in which only a particular wavelength reciprocates between the two fiber grating mirrors 110a and 110b. Accordingly, a double resonator structure is formed. In the double resonator structure, since the ring laser resonator 100 and the linear laser resonator 120 composed of the fiber grating mirrors 110a and 110b provide different conditions, independent laser light beams can be generated from the single optical oscillator. Hence, the ring laser resonator 100 can be transformed into a double-mode laser oscillator. If two laser modes are oscillated at the same time, optical power is modulated and oscillated to a beat frequency generated due to the difference in frequency between the two modes.

However, since the two laser resonators 100 and 120 must divide the gain of an optical amplification medium, one of the wavelengths and polarizations of the fiber grating mirrors 110a and 110b must be very appropriately selected. In addition, it is technically difficult that the two laser resonators 100 and 120 divide the gain of an optical amplification medium depending on an irregular birefringence occurring within a fiber. Since the optical oscillator according to the present invention is designed to be able to simultaneously oscillate lasers of two modes using a birefringence, the optical oscillator has a simple structure and can oscillate high frequency laser with a frequency of 60 GHz or greater that cannot be achieved by existing optical modulators.

The range of the wavelength of light that can be reflected by each of the fiber grating mirrors 110a and 110b can vary by mechanically (or electrically) adjusting the grating interval of each of the two mirrors 110a and 110b. For example, the grating of each of the fiber grating mirrors 110a and 110b is strained by a mechanical stress applied to both sides of the mirror, and consequently the wavelength range of light that can be reflected is changed. The wavelength range of reflected light can also be changed by heating each of the fiber grating mirrors 110a and 110b. The variations in the wavelength of light reflected by the fiber grating mirrors 110a and 110b affect a change in the wavelength of oscillated laser. Consequently, if the wavelength of light that can be reflected is consecutively changed, a modulation frequency may be changed consecutively, e.g., from 60 GHz to 80 GHz.

Compared to the aforementioned complicate optical oscillators filed in 1999 and 2000 by the present applicant, the optical oscillator according to the present invention does not need to use a fiber coupler for coupling a ring laser resonator to a linear laser resonator or coupling two ring laser resonators. Therefore, the optical oscillator according to the present invention can overcome an oscillation at a low frequency due to a loss caused by the fiber coupler.

Also, the optical oscillator according to the present invention require neither a second laser resonator (i.e., a linear or ring laser resonator) to be coupled to the basic ring laser resonator nor a PC to be installed on the second laser resonator, such that the optical oscillator according to the present invention has a simple structure. Furthermore, the optical oscillator according to the present invention can vary the modulation frequency through a simple mechanical manipulation to control the grating interval of a fiber grating mirror, thereby providing a high performance.

Figure 2:
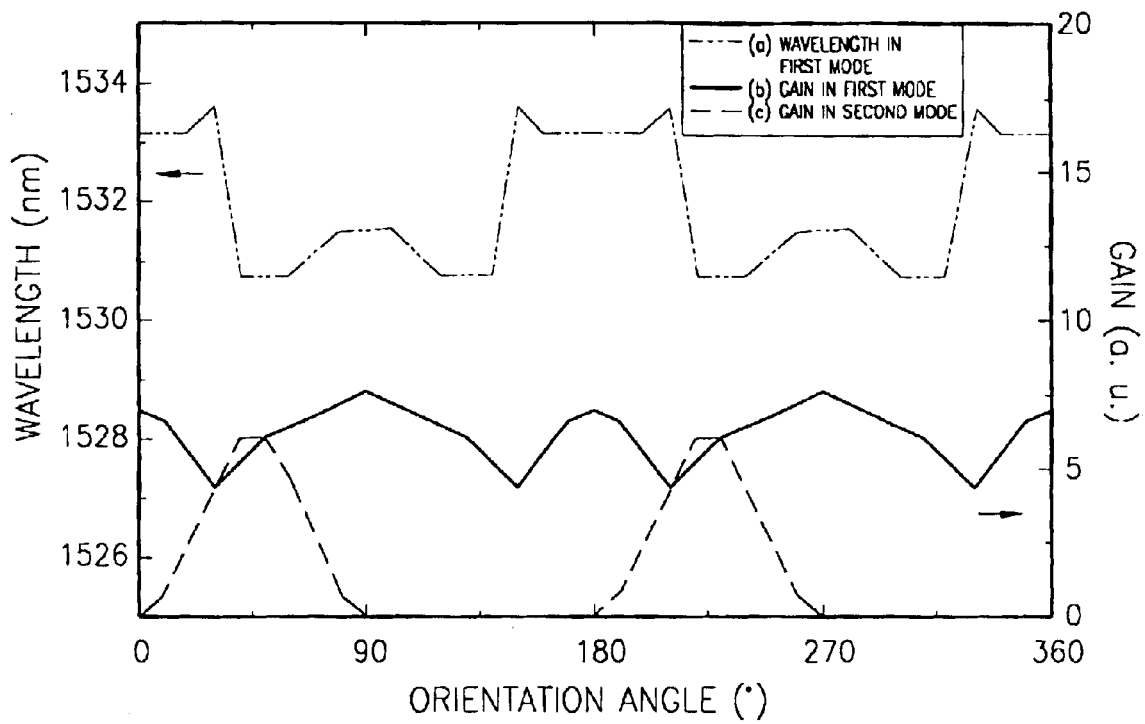
FIG. 2 is a graph showing light wavelengths and gains with respect to variations in the angle of a polarization controller in a laser resonator according to the present invention.
Figure 3:
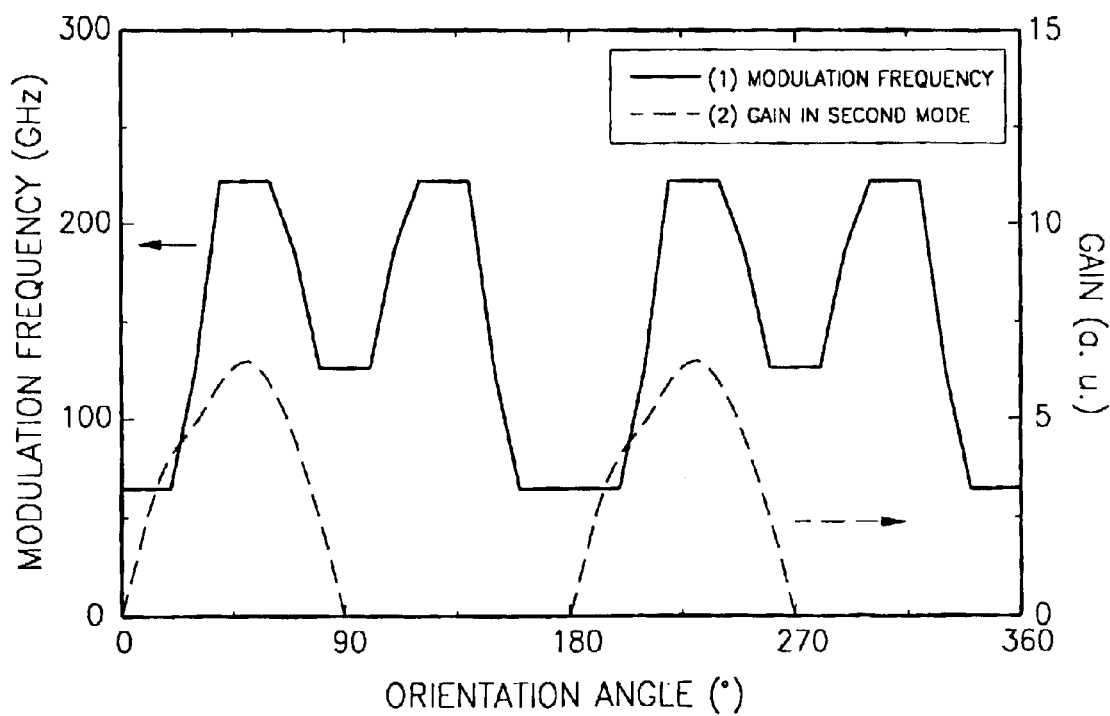
FIG. 3 is a graph showing variations in a modulation frequency with respect to the angle of a polarization controller in a laser resonator according to the present invention.
Figure 4:
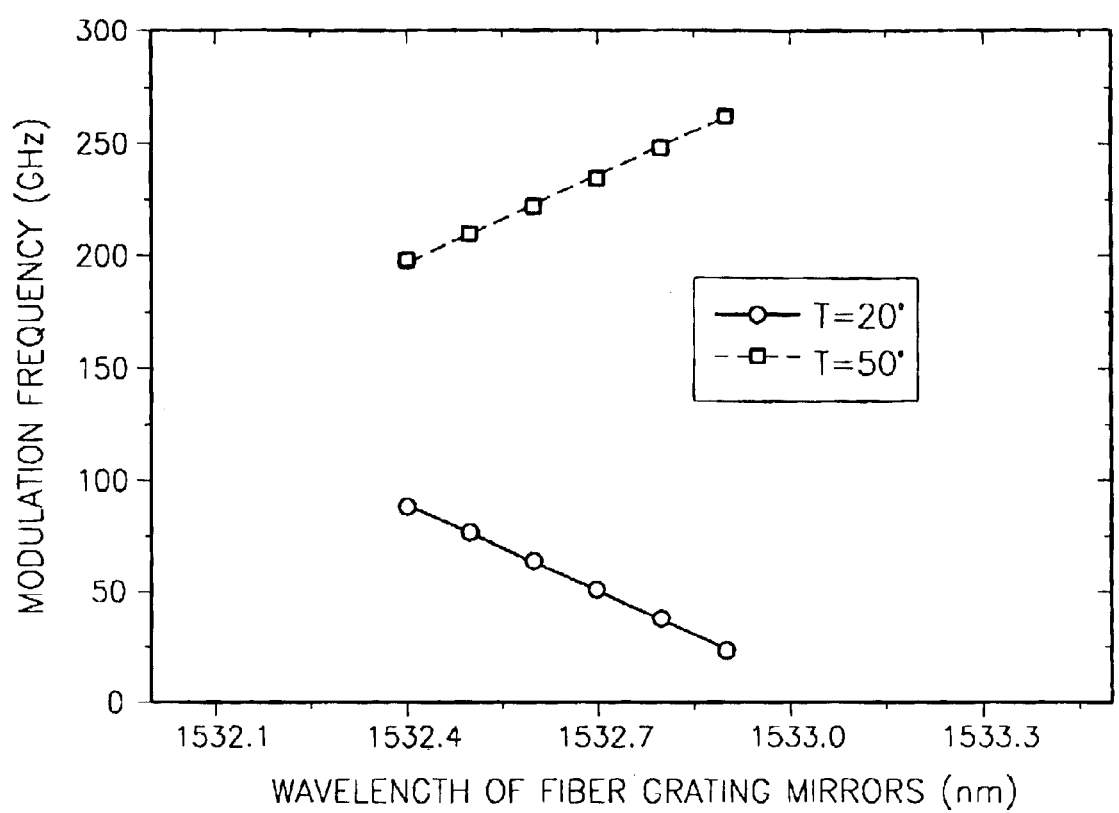
FIG. 4 is a graph showing variations in the modulation frequency of an optical oscillator with respect to variations in the wavelength of reflected light of fiber grating mirrors in a laser resonator according to the present invention.

The structure of the optical oscillator according to the present invention of FIG. 1 will now be described in more detail with reference to FIGS. 2 through 4. FIG. 2 is a graph showing light wavelengths and gains with respect to variations in the angle of the PC 140 of the optical oscillator of FIG. 1. FIG. 3 is a graph showing variations in the modulation frequency of laser with respect to the angle of the PC 140 in the optical oscillator of FIG. 1. FIG. 4 is a graph showing variations in the modulation frequency of the optical oscillator of FIG. 1 with respect to variations in the wavelength of reflected light of the fiber grating mirrors 110a and 110b.

Light beams of a plurality of wavelengths produced due to spontaneous emission of electrons pumped by a pump laser (not shown) proceed along a fiber at both ends of the LAF 130. Light beams beyond the wavelength range of light reflected by the fiber grating mirrors 110a and 110b pass the DC 145 counterclockwise as shown in the first mode of FIG. 1 and travel within the ring laser resonator 100 whose length is 7 m (the sum of the 3 m length of the LAF 130 and the 4 m length of the DSF 135). At this time, laser of the first mode is oscillated in accordance with the integrated gain of a polarization gain corresponding to a birefringence by the ring laser resonator 100 and a pumping gain of the LAF 130 as shown in FIG. 2. On the other hand, light beams existing within the wavelength range of light reflected by the fiber grating mirror 110b are reflected by the fiber grating mirror 110b before the DC 145 and pass the LAF 130 again and are reflected by the fiber grating mirror 110a behind the DC 145, such that the light beams reciprocate between the two fiber grating mirrors 110a and 110b. In this way, laser of the second mode is generated by travelling the path of the linear laser resonator 120 composed of the two fiber-grating mirrors 110a and 110b, which is different from the resonator path travelled by the first mode laser.

The laser of the second mode undergoes a birefringence of a fiber while reciprocating and provides a loss of an output port twice as great as the output port loss of the first mode laser. However, the second mode laser provides a doubled optical amplification gain while going to and returning from a 14 m-long resonator, the number 14 m being nearly twice the travelling distance of the first mode laser. Hence, since the second mode laser has a higher gain than the gain of the first mode laser travelling a simple path, the second mode laser may be often oscillated alone in unless the high gain is controlled by the PC 140.

If the PC 140 and the wavelength range of reflected light are appropriately controlled, the first and second modes can be simultaneously oscillated. The gain of a polarization mode within a certain range was simulated as shown in FIG. 2.

With the central wavelength of light reflected by the fiber grating mirrors 110a and 110b being fixed to 1532.64 nm, if the angle of the PC 140 is oriented, the integrated gain of the gains of the first and second modes greatly varies. Referring to FIG. 2, the wavelength of a consecutive wave in the oscillating first mode varies as indicated by two-dot one-dashed line (a), and the gain of the oscillating first mode varies as indicated by solid line (b). Meanwhile, because the second mode going to and returning from the linear laser resonator 120 is fixed to a single wavelength, the gain of the second mode is restricted as indicated by dashed line (c), and consequently, an angle area where laser is not oscillated may be generated.

A modulation frequency based on the difference in frequency between the two first and second modes was simulated as shown in solid line (1) of FIG. 3. It can be seen from solid line (1) that three modulation frequencies of 64 GHz, 126 GHz, and 222 GHz can be achieved. However, considering areas where the second mode is not oscillated as shown in dashed line (2), 222 GHz and 64 GHz are achieved at a narrow angle of about 30 degrees. However, because 222 GHz is unstable, it cannot be used.

The wavelength range of the second mode is determined by the grating interval of each of the fiber grating mirrors 110a and 110b. If the grating interval is mechanically adjusted, the central wavelength of light reflected by each of the fiber grating mirrors 110a and 110b can be changed by a maximum of about 4 nm. The modulation frequency of the optical oscillator according to the present invention with respect to the central wavelength of the fiber grating mirrors 110a and 110b that changes as described above varied as shown in FIG. 4. In FIG. 4, T denotes an angle controlled by the PC 140.

The present invention can provide a frequency tuneable optical oscillator in which the modulation frequency of generated laser consecutively varies from 60 GHz to 80 GHz by controlling the wavelength of light reflected by fiber grating mirrors included in a signal optical oscillator. The frequency tuneable optical oscillator will be used as a frequency oscillator or a high frequency optical signal oscillator in wired/wireless integrated millimeter wave telecommunication equipment for ultra-speed wireless Internet services. In addition, if the frequency tuneable optical oscillator is utilized as a core component part of a wired ultra-speed optical transmission system, it can replace an imported oscillator, thus reducing the manufacturing costs.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A frequency tunable optical oscillator, comprising two fiber grating mirrors able to reflect varying wavelengths of light, installed within a fiber-ring laser resonator in order to form a linear laser resonator that reciprocates between the two fiber grating mirrors, wherein a beat phenomenon occurs between two laser modes oscillated by the fiber-ring laser resonator and the linear laser oscillator, respectively, and wherein the frequency tunable optical oscillator can vary a modulation frequency by manipulating a grating interval of a fiber grating mirror.

2. The frequency tunable optical oscillator of claim 1, wherein the fiber-ring laser resonator includes a polarization controller for modulating a frequency of output light.

3. The frequency tunable optical oscillator of claim 1, wherein the fiber-ring laser resonator comprises:
a wavelength division multiplexing (WDM) coupler receiving pump laser;
a light amplifying fiber amplifying light received from the WDM coupler;
a dispersion shifting fiber performing nonlinear polarization on light received from the light amplifying fiber;
a direction controller controlling the direction of light received from the dispersion shifting fiber;
a polarization controller modulating a frequency of output light by controlling the angle of light received from the direction controller; and an output port outputting the output light;

wherein the two fiber grating mirrors are installed before and behind the direction controller, respectively.

4. The frequency tunable optical oscillator of claim 3, wherein the length of the light amplifying fiber is 3 m, the length of the dispersion shifting fiber is 4 m, and the output port is a 10% fiber coupler.

5. The frequency tunable oscillator of claim 2, wherein a frequency of output light is consecutively changed from 60 GHz to 80 GHz by controlling angle of a polarization controller and a wavelength of light reflected by the two fiber grating mirrors by manipulating a grating interval of a fiber grating mirror.

6. A frequency tunable optical oscillator, comprising:

two fiber grating mirrors able to reflect varying wavelengths of light, installed within a fiber-ring laser resonator in order to form a linear laser resonator that reciprocates between the two fiber grating mirrors, wherein a beat phenomenon occurs between two laser modes oscillated by the fiber-ring laser resonator and the linear laser oscillator, respectively, and wherein the frequency tunable optical oscillator can vary a modulation frequency by manipulating a grating interval of a fiber grating mirror;

a wavelength division multiplexing (WDM) coupler receiving pump laser;

a light amplifying fiber amplifying light received from the WDM coupler;

a dispersion shifting fiber performing nonlinear polarization on light received from the light amplifying fiber;

a direction controller controlling the direction of light received from the dispersion shifting fiber;

a polarization controller modulating a frequency of output light by controlling the angle of light received from the direction controller; and an output port outputting the output light;

wherein the two fiber grating mirrors are installed before and behind the direction controller, respectively.

7. A frequency tunable optical oscillator, comprising:

two fiber grating mirrors able to reflect varying wavelengths of light, installed within a fiber-ring laser resonator in order to form a linear laser resonator that reciprocates between the two fiber grating mirrors, wherein a beat phenomenon occurs between two laser modes oscillated by the fiber-ring laser resonator and the linear laser oscillator, respectively, and wherein the frequency tunable optical oscillator can vary a modulation frequency by manipulating a grating interval of a fiber grating mirror;

a wavelength division multiplexing (WDM) coupler receiving pump laser;

a light amplifying fiber amplifying light received from the WDM coupler;

a dispersion shifting fiber performing nonlinear polarization on light received from the light amplifying fiber;

a direction controller controlling the direction of light received from the dispersion shifting fiber;

a polarization controller modulating the a frequency of output light by controlling the angle of light received from the direction controller; and an output port outputting the output light;

wherein the two fiber grating mirrors are installed before and behind the direction controller, respectively.

wherein the length of the light amplifying fiber is 3 m, the length of the dispersion shifting fiber is 4 m, and the output port is a 10% fiber coupler.

8. A frequency tunable optical oscillator, comprising:

two fiber grating mirrors able to reflect varying wavelengths of light, installed within a fiber-ring laser resonator in order to form a linear laser resonator that reciprocates between the two fiber grating mirrors, wherein a beat phenomenon occurs between two laser modes oscillated by the fiber-ring laser resonator and the linear laser oscillator, respectively, and wherein the frequency tunable optical oscillator can vary a modulation frequency by manipulating a grating interval of a fiber grating mirror, wherein the fiber-ring laser resonator includes a polarization controller for modulating a frequency of output light, wherein a frequency of the output light is consecutively changed from 60 GHz to 80 GHz by controlling angle of a polarization controller and the a wavelength of light reflected by the two fiber grating mirrors by manipulating a grating interval of a fiber grating mirror.

* * * * *